US008416415B2

(12) United States Patent
Woodmansee et al.

(10) Patent No.: US 8,416,415 B2
(45) Date of Patent: Apr. 9, 2013

(54) GAS TURBINE OPTICAL IMAGING SYSTEM (75) Inventors: Mark Allen Woodmansee, Guildford (GB); Samit Kumar Basu, Fremont, CA (US); Vijay Kumar Yaram, Bangalore (IN); Weiguo Chen, Shanghai (CN); Yikang Gu, Shanghai (CN); Kevin Michael Hinckley, Hanover, NH (US)

(73) Assignee: General Electric Company, Niskayuna, NY (US)

( * ) Notice: Subject to any disclaimer, the term of this patent is extended or adjusted under 35 U.S.C. 154(b) by 1000 days.

(21) Appl. No.: 12/430,337

(22) Filed: Apr. 27, 2009

(65) Prior Publication Data
US 2010/0272557 A1 Oct. 28, 2010

(51) Int. Cl.
*G01N 21/00* (2006.01)
(52) U.S. Cl.
USPC .......................................... 356/437; 356/440
(58) Field of Classification Search .................. None
See application file for complete search history.

(56) References Cited

U.S. PATENT DOCUMENTS

| | | | |
|---|---|---|---|
| 3,586,970 A | 6/1971 | Conway et al. | |
| 3,597,920 A | 8/1971 | Wadman | |
| 4,057,725 A | 11/1977 | Wagner | |
| 4,286,156 A | 8/1981 | Wagner | |
| 4,295,047 A | 10/1981 | Koga et al. | |
| 4,386,854 A | 6/1983 | Byer | |
| 5,148,667 A | 9/1992 | Morey | |
| 5,173,749 A | 12/1992 | Tell et al. | |
| 5,185,996 A | 2/1993 | Smith et al. | |
| 5,384,467 A | 1/1995 | Plimon et al. | |
| 5,428,447 A | 6/1995 | Toida | |
| 5,636,035 A | 6/1997 | Whittaker et al. | |
| 5,659,133 A | 8/1997 | Sims et al. | |
| 5,798,840 A | 8/1998 | Beiting | |
| 5,803,607 A | 9/1998 | Jones et al. | |
| 5,813,767 A | 9/1998 | Calabro' et al. | |
| 6,341,890 B1 | 1/2002 | Vally et al. | |
| 6,353,225 B1 | 3/2002 | Strzoda et al. | |

(Continued)

FOREIGN PATENT DOCUMENTS

| | | |
|---|---|---|
| EP | 0766080 | 4/1997 |
| JP | 61286537 | 12/1986 |

(Continued)

OTHER PUBLICATIONS

Beiting, Edward J., "Fiber-optic fan-beam absorption tomography," Applied Optics, Mar. 20, 1992, pp. 1328-1343; vol. 31, No. 9.

(Continued)

*Primary Examiner* — Gregory J Toatley
*Assistant Examiner* — Amanda Merlino
(74) *Attorney, Agent, or Firm* — Ann M. Agosti (57) ABSTRACT

A method and system for recreating a two-dimensional distribution of temperatures in an exhaust plane of a gas turbine engine. Light transmission and detection pairs may be arranged in the annulus of the exhaust of the turbine engine in such a way that the individual rays form a two-dimensional mesh of beams across a sector of the exhaust. Based on the absorption of the rays, the temperature of the sector of the exhaust thru which the ray passes may be determined. Based on these determinations, an image that corresponds to the operation of the turbine engine may be generated.

16 Claims, 6 Drawing Sheets

U.S. PATENT DOCUMENTS

| | | | |
|---|---|---|---|
| 6,490,868 B1 | 12/2002 | Bunce et al. | |
| 6,593,573 B1 | 7/2003 | McCann et al. | |
| 7,375,815 B2* | 5/2008 | Kralik | 356/440 |
| 2006/0109470 A1* | 5/2006 | May | 356/437 |

FOREIGN PATENT DOCUMENTS

| | | |
|---|---|---|
| JP | 8110296 | 4/1996 |
| WO | 0046979 | 8/2000 |
| WO | 02088684 | 11/2002 |

OTHER PUBLICATIONS

Kessler, William J. et al., "Tomographic Reconstruction of Air Temperature and Density Profiles Using Tunable Diode Laser Absorption Measurements on O2," 26th AIAA Plasmadynamics and Lasers Conference; Jun. 19-22, San Diego, CA 1995; American Institute of Aeronautics and Astronautics.

Skaggs, R. Reed et al., "A Study of Carbon Monoxide in a Series of Laminar Ethylene/Air Diffusion Flames Using Tunable Diode Laser Absorption Spectroscopy," Combustion and Flame 100: 430-439, 1995, Elsevier Science Inc.

Adam, Hamish et al., "Laser gas detection is now cheap, fast and reliable," Product literature for Boreal Laser GasFinderMC, Jan. 1, 2004.

Allen, Mark; Diode Laser Absorption Sensors for Gas Dynamic and Combustion Flows; Measurement Science and Technology 9: 545-562; 1998.

Linnerud, I.; Kaspersen, P.; and Jaeger, T.; Gas Monitoring in the Process Industry Using Diode Laser Spectroscopy; Applied Physics B 67; 297-305; 1998.

Oh, Daniel B.; Staton, Alab C. Measurement of Nitric Oxide with Diode Laser; Applieed Optics; vol. 36; No. 15; May 20, 1007.

Tittel, Frank K.; Lancaster David G.; Richter, Dirk; Curl, Rober F.; and Graf, John C.; Laser Based Absorption Sensors for Trace Gas Monitoring in a Spacecraft Habitat; Society of Automotive Engineers; IC 99ES-102; 1999.

* cited by examiner

GAS TURBINE OPTICAL IMAGING SYSTEM

BACKGROUND

The invention relates generally to gas turbine engines, and more particularly to a system and method for monitoring the efficiency of a turbine engine.

Modern gas turbines may be monitored to ensure efficient operation. One manner of monitoring the gas turbines may include arranging an ensemble of thermocouples (TCs), typically metallic measurement instruments, around the exhaust annulus of a gas turbine to monitor the temperature of the gas-phase products leaving the engine. Typically, the absolute and relative temperatures measures by these TCs may be fed into a digital control system (DCS) to regulate the air intake and fuel flow rate of the gas turbine so as to increase the overall performance of the engine.

Due to their size and discrete placement, the TCs are limited in their ability to make an accurate estimate of the average temperature in the exhaust. Attempts to overcome this shortcoming have included adding more TC's into the exhaust annulus. However, as more TCs are added to the exhaust annulus, the pressure drop across the metal instrumentation rakes in the exhaust grows. This may lead to increased back pressure on the engine, which may deleteriously alter performance. Accordingly, there is a need for techniques and systems that may accurately monitor and adjust the efficiency and performance of a gas turbine engine, while minimizing the back pressure induced to the engine via the monitoring equipment.

BRIEF DESCRIPTION

In a first embodiment, an gas turbine fuel nozzle includes an engine efficiency monitoring system comprising a laser adapted to transmit light at a specified frequency, an imaging fixture comprising a first side adapted to transmit the light as absorption light and a second side adapted to receive the absorption light, and an imaging system adapted to generate an image representative of the absorption light.

In a second embodiment, a turbine system includes a combustor adapted to ignite a fuel source to generate pressurized exhaust gases, an exhaust adapted to vent the pressurized exhaust gases, wherein the exhaust comprises an imaging fixture adapted to transmit light from a first side of the imaging fixture to a second side of the imaging fixture, and an imaging system adapted to generate an image representative of the temperature in a region of the exhaust.

In a third embodiment, a method includes transmitting light across an imaging fixture in the exhaust of a turbine from a transmission location, receiving the transmitted light at a reception location in the imaging fixture, determining the absorption of the light at a converter, and generating an image representative of the absorption light.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

This disclosure describes the use of tunable diode laser technology to measure the temperature of the exhaust of a gas turbine engine. The laser, as well as corresponding laser detectors, are arranged in the annulus of the turbine exhaust in such a way that a two-dimensional mesh of beams across a sector of the exhaust is formed. Based on the amount of light absorbed when transmitted from the laser to the detector, the temperature of the exhaust may be determined. Furthermore, image reconstruction techniques may be applied to recreate the two-dimensional distributions of temperature in the exhaust plane of a gas turbine engine, whereby the images of the exhaust temperature may be recreated in real time. The laser may be tuned to transmit light at many different wavelengths, allowing for measurements of water vapor, oxygen, and carbon dioxide in the exhaust, allowing for a more robust calculation of the exhaust temperature. By measuring the temperature of the exhaust, malfunctions in the gas turbine, such as underperformance of the compressor, combustion, or turbine components of the gas turbine, may be diagnosed. Furthermore, the results of the measurements may be transmitted to a digital control system for regulation and control of the gas turbine engine.

Figure 1:
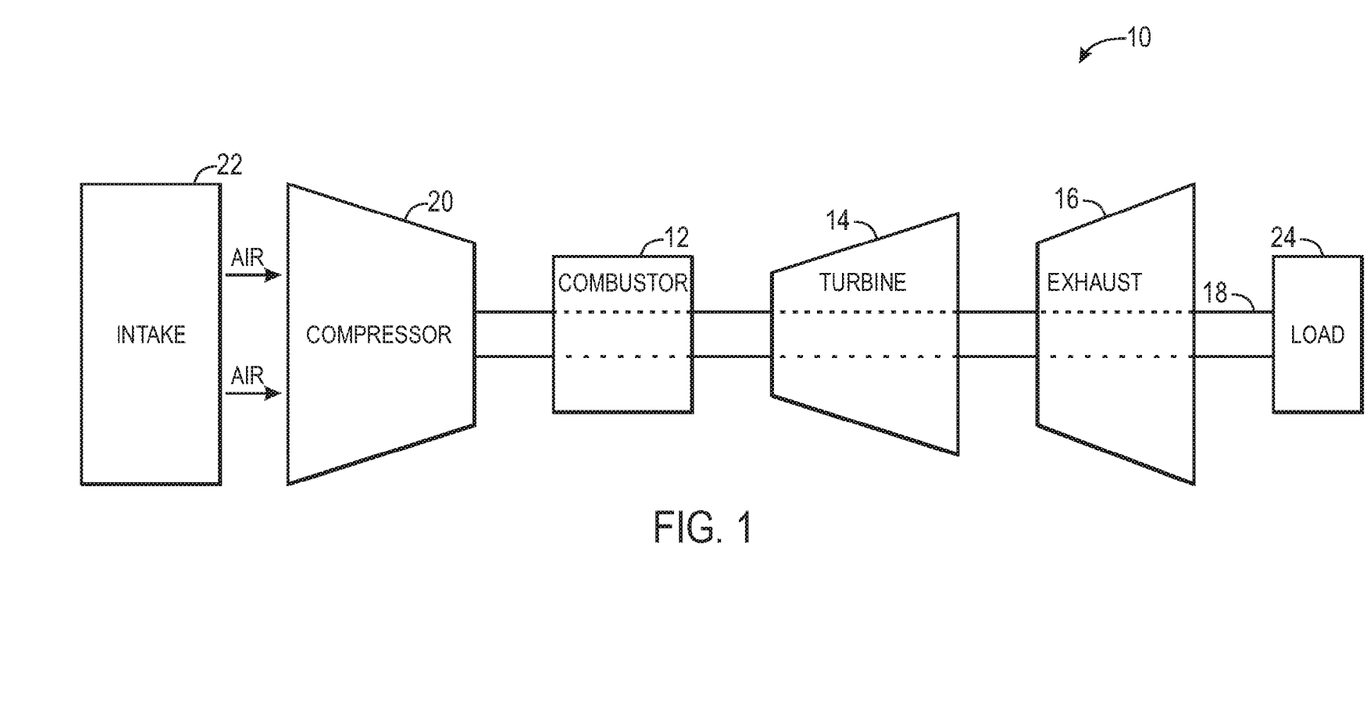
FIG. 1 is a block diagram of a gas turbine engine in accordance with an embodiment of the embodiments described herein.

Turning now to the drawings and referring first to FIG. 1, a block diagram of an embodiment of gas turbine engine 10 is illustrated. As depicted, the gas turbine engine 10 includes a combustor 12. The combustor 12 may be a can-annular combustion chamber, that is, the combustor 12 may have characteristics of both an annular and a can type combustion chamber whereby the combustor 12 may consist of an outer shell, with a number of individual cylindrical combustion cans. The combustor 12 receives fuel, which may be sprayed under pressure from fuel nozzles. The fuel may be mixed with air for combustion within combustor 12. This combustion creates hot pressurized exhaust gases.

The combustor 12 directs the exhaust gases through a turbine 14 towards an exhaust outlet 16. In the illustrated embodiment, the exhaust outlet 16 includes a divergent annular passage encircling a drive shaft 18. Furthermore, as the exhaust gases from the combustor 12 pass through the turbine 14 to the exhaust outlet 16, the gases force turbine blades to rotate a drive shaft 18 along an axis of the gas turbine engine 10. As illustrated, drive shaft 18 is connected to various components of the gas turbine engine 10, including a compressor 20.

The drive shaft 18 connects the turbine 14 to the compressor 20 to form a rotor. The compressor 20 includes blades coupled to the drive shaft 18. Thus, rotation of turbine blades in the turbine 14 causes the drive shaft 18 connecting the turbine 14 to the compressor 20 to rotate blades within the compressor 20. This in turn causes the compressor 20 to compress air, received via the air intake 22. The compressed air is fed to the combustor 12 and mixed with fuel to allow for higher efficiency combustion. A drive shaft 18 is also connected to load 24, which may be a vehicle or a stationary load, such as an electrical generator in a power plant or a propeller on an aircraft. Indeed, load 24 may be any suitable device that is powered by the rotational output of the gas turbine engine 10. The techniques described below allow for monitoring of the efficiency of the gas turbine engine 10 without compromising the performance of the engine 10.

Figure 2:
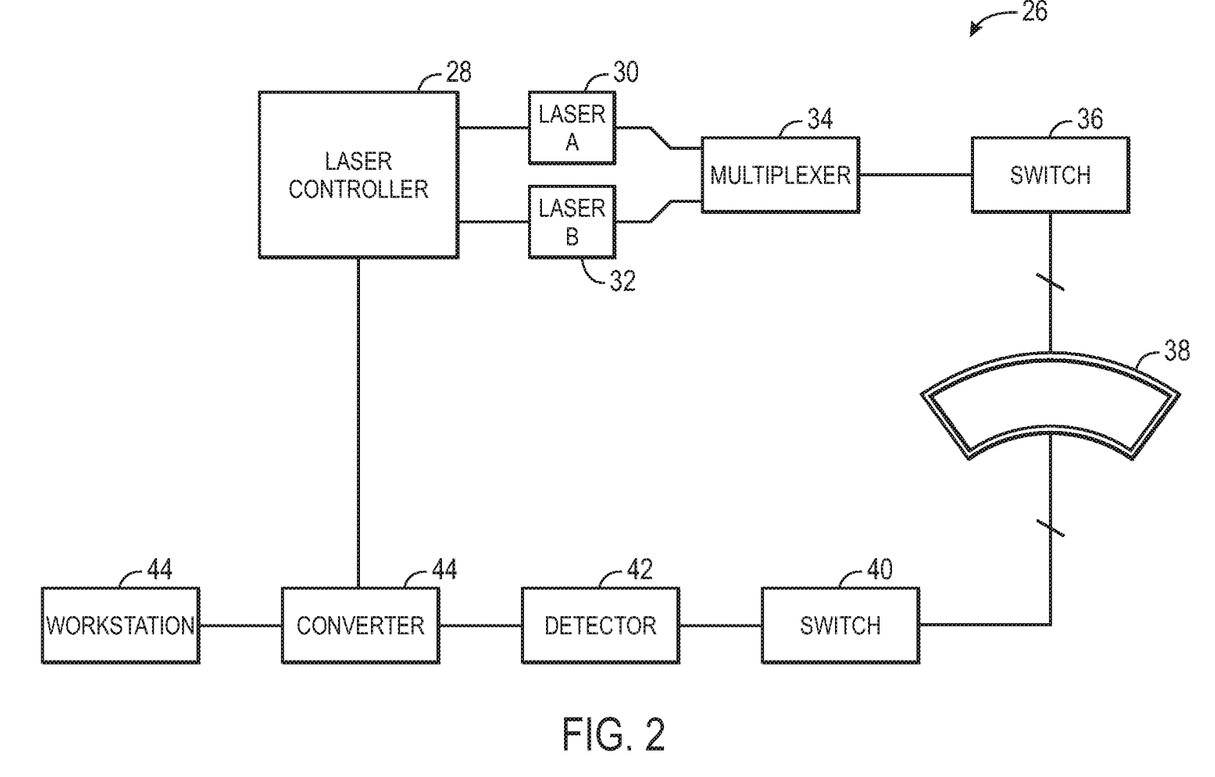
FIG. 2 is a block diagram of a tunable diode laser absorption spectroscopy system.

FIG. 2 illustrates an exhaust measurement system 26 that may utilize tunable diode laser absorption spectroscopy in conjunction with the exhaust 16, i.e. exhaust outlet, of the gas turbine engine 10 to measure exhaust temperature of the gas turbine engine 10. The exhaust measurement system 26 may include a laser controller 28, a first laser 30, a second laser 32, a multiplexer 34, an expansion switch 36, an image fixture 38, a condensing switch 40, a detector 42, a converter 44, and a workstation 46. The laser controller 28 may provide a controlled current and temperature for the lasers 30 and 32 so that a constant output power may be generated by the lasers 30 and 32. In one embodiment, the laser controller may be a laser diode controller, which may be controlled via external inputs, such as by a feedback signal from the converter 44.

Lasers 30 and 32 may, in one embodiment, be infrared lasers. That is, the light transmitted from the lasers 30 and 32 may be at an infrared frequency. In one embodiment, the first laser 30 and the second laser 32 may provide two independent light beams at a first frequency and a second frequency. These frequencies may be chosen such that the first and second frequencies may be utilized to scan over two distinct molecular, i.e., spectroscopic, transitions. That is, the frequencies may be chosen a priori such that each of the lasers 30 and 32 may access a different transition of a probe molecule. In one embodiment, the first laser 30 may scan over the 6862 $cm^{-1}$ transitions of an $H_2O$ molecule, while the second laser 32 may scan over the 6673 $cm^{-1}$ transition of an $H_2O$ molecule. In another embodiment, the first laser 30 may be the only laser utilized to generate light for the exhaust measurement system 26. In this embodiment, the first laser 30 may be tuned to transmit light at two, or more, wavelengths.

The exhaust measurement system 26 may further include a multiplexer 34. The multiplexer 34 may be fiber-optically coupled to the first and second lasers 30 and 23 via fiber optic cable. The multiplexer 34 may, for example, be a passive 2×1 multiplexer that may pass a single one of two inputs to a single output line. It is envisioned that the multiplexer 34 may also be an N×1 multiplexer for any embodiments that utilize N lasers. The single output of the multiplexer 34 may be a fiber optic cable that connects to the compression switch 36.

The expansion switch 36 may be a 1×N optical switch, whereby light received from the multiplexer 34 may be serially applied to N discrete single-mode fiber optic cables, where N is any integer greater than 1. In one embodiment, N may be 24. The expansion switch 36 may be controlled via control commands from, for example, the converter 44. These control signals control the order in which the light received from the multiplexer 34 is applied to the N fiber optic cables. The N fiber optic cables exiting the expansion switch may be coupled to the imaging fixture 38.

The N fiber optic cables coupled to the imaging fixture provide paths for light to be transmitted to the imaging fixture 38 such that each of the N fiber optic cables may terminate with an optical collimator at the interior edge of the imaging fixture 38 to form a columnar beam that may be transmitted across the fixture 38. This transmitting assembly may be referred to as a pitch. After propagating across the fixture 38, the light beam may be captured by a dedicated reception collimator on a second inner surface of the imaging frame 38. The reception collimators focus the received light beam onto a respective fiber optic cable, which may be a multimode fiber with a diameter core of, for example, 400 μm. The receiving assembly of the imaging fixture 38 may be referred to as a catch. In one embodiment, the number of transmission collimators and the number of reception collimators in the imaging fixture 38 are equivalent.

Additionally, the imaging fixture 38 may be hollow, such that the imaging fixture 38 may include a wireway sized for fiber optic cables to be located inside of the imaging fixture 38. A single wireway may be utilized for the fiber optic cables of the pitch and catch assemblies. Alternatively, separate wireways may be utilized for each of the pitch and catch assemblies.

The fiber optic cables of the catch exit the wireway of the imaging fixture 38 and are coupled to the condensing switch 40. In this manner, the fiber optic cables of the catch transport the light beams received from the pitch to the condensing switch 40. The condensing switch 40 may be an N×1 optical switch, where N is any positive integer greater than 1. The condensing switch 40 may operate in a reverse manner to the expansion switch 36 described above. Namely, the condensing switch 40 may serially apply received light from N fiber optic cables and transmit the light to a single fiber optic cable, based on control commands from, for example, the converter 44. These control signals may control the order in which the light received from the imaging fixture 38 is applied to the single fiber optic cable output of the condensing switch 40. The N fiber optic cable exiting the condensing switch 40 may be coupled to a detector 42.

The detector 42 converts the light signals transmitted from the condensing switch 42 into an analog electronic signal. In one embodiment, the detector 42 may be, for example, an amplified, switchable-gain, Indium gallium arsenide (InGaAs) detector designed to detect and convert light signals into electronic signals. These electronic signals are transmitted to a converter 44.

The converter 44 receives the electronic signals from the detector 42 and converts the analog signals into digital signals via an analog-to-digital converter (A/D) in the converter 44. The converter 44 may include one or more processors that may be digital signal processors, microprocessors, field-programmable gate arrays, complex programmable logic devices, application specific integrated circuits, and/or other known logic circuitry. The processor(s) may be utilized to process the digital signals from the A/D converter. Based on these digital signals, the processor(s) provide an output signal to the laser controller 28. This output signal may be, for example, a sawtooth wave that may be utilized by the laser controller 28 to control the modulation, the frequency, and the timing of the lasers. The processor(s) of the controller 44 may also provide commands to both the expansion switch 36 and the condensing switch 40. Accordingly, the processor(s) of the converter 44 synchronize the firing of the lasers with operation of the switches. For example, once the processor(s) cause the switches 36 and 40 to scroll through all N fiber optic cables in a serial fashion, transmitting the light at frequencies controlled by the laser controller 28, the resultant light signals may be converted by the processor(s) for generation of resultant temperature data. This resultant temperature data may, for example, be utilized via image reconstruction to generate a two-dimensional temperature distribution on a monitor of, for example, the workstation 46. Alternatively, the image reconstruction may occur in the converter 44.

As described above, the processed digital signals may be transmitted from the converter 44 to a workstation 46. The workstation 46 may comprise hardware elements (including circuitry), software elements (including computer code stored on a computer-readable medium) or a combination of both hardware and software elements. The workstation 46 may be, for example, a desktop computer, a portable computer, such as a laptop, a notebook, or a tablet computer, a server, or any other type of computing device. Accordingly, the workstation may include one or more processors, for example, one or more "general-purpose" microprocessors, one or more special-purpose microprocessors and/or ASICS, or some combination of such processing components. The workstation may also include memory which, for example, may store instructions or data to be processed by the one or more processors 22 such as firmware for operation of the workstation, i.e., basic input/output instructions or operating system instructions, and/or various programs, applications, or routines executable on the workstation 46. The workstation 46 may further include a display for displaying one or more images relating to the operation of the various programs of the workstation 46 and input structures, which may allow a user to interface and/or control the workstation 46. As will be described below, the workstation 46 may include hardware and/or computer code storable in the memory of the workstation and executable by the processor for performing image reconstruction techniques recreate two-dimensional distributions of exhaust temperature in the exhaust plane of the gas turbine engine 10.

Figure 3A:
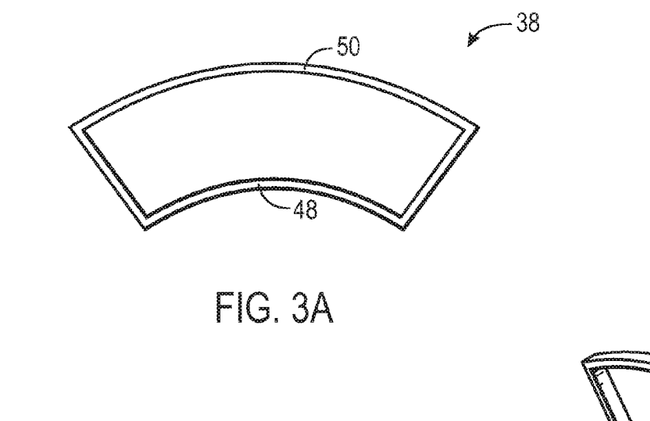
FIGS. 3A-3D are diagrams of an image fixture for use with the tunable diode laser absorption spectroscopy system of FIG. 1.
Figure 3B:
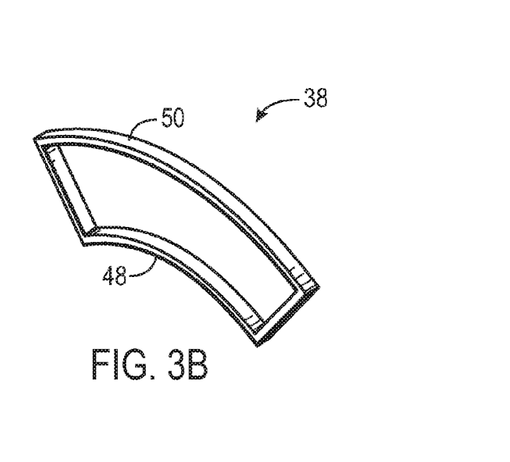
Figure 3C:
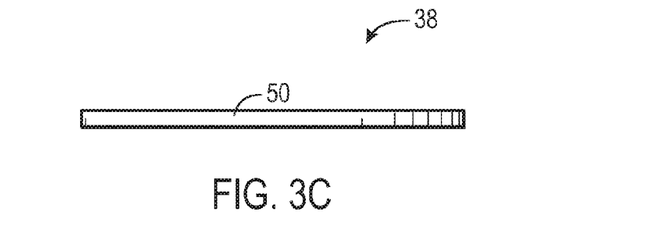
Figure 3D:
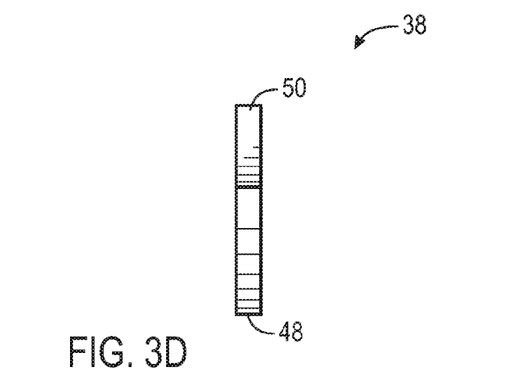

FIG. 3A illustrates a front view of an imaging fixture 38 that may be utilized in conjunction with the gas turbine engine 10, as described above with regard to FIG. 2. In one embodiment, the imaging fixture 38 may be a frame that includes an inner radius 48 and an outer radius 50. The inner radius 48 of the fixture 26 may be mounted to, for example, a shroud covering the drive shaft 18. Likewise, the outer radius 50 of the fixture 38 may be mounted to, for example, a liner of the exhaust outlet 16. Thus, the imaging fixture 38 may be inserted into the diverging passage of the exhaust 16 outlet in such a manner as to allow the exhaust flow from the turbine 14 to flow through the imaging fixture 38. In one embodiment, the temperature in one section of the exhaust outlet 16 of the gas turbine 10 may be examined using the aforementioned imaging fixture 38, since the fixture 38 may be sized to encompass only a single sector of the annulus in the exhaust outlet 16. Accordingly, multiple fixtures 38 may be utilized in conjunction to monitor of the entire annulus of the exhaust outlet 16. FIG. 3B illustrates an oblique perspective view of the imaging fixture 38, while FIGS. 3C and 3D illustrate a top and side view of the imaging fixture 38, respectively.

Figure 4:
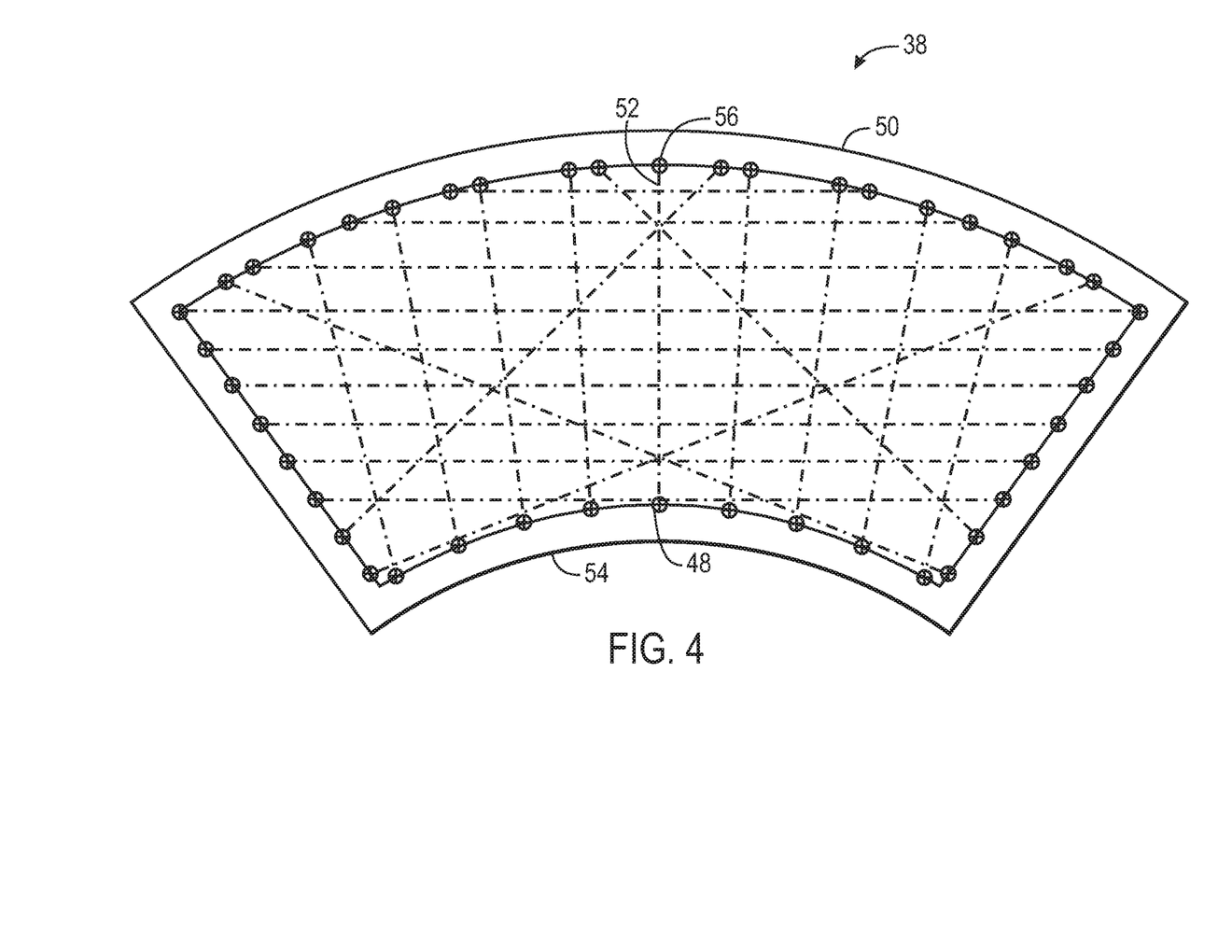
FIG. 4 is a diagram of laser transmission and reception across the image fixture of FIGS. 3A-3D.

The imaging fixture 38 may accommodate optic transmitters and receivers around the periphery of the imaging fixture 38. FIG. 4 illustrates these optic transmission locations 52 and optic reception locations 54 in conjunction with the imaging fixture 38. The optic transmission locations 52 and optic reception locations 54 may be arranged along the inner portion of the inner and outer radii 48 and 50 of the imaging fixture 38 and may be directed in such a manner as to form a two-dimensional mesh of optical beams 56 between the transmission locations 52 and the reception locations 54. In one embodiment the transmission locations 52 and the reception locations 54 may be located on opposite sides of the imaging fixture 38. For example, the transmission locations may be located on an inner surface of the upper portion of the imaging fixture 38 while the reception locations may be located on an inner surface of the lower portion of the imaging fixture 38. Regardless of the location of the transmission locations 52 and the reception locations 54, the locations 52 and 54 may be paired such that transmissions may be transmitted across the imaging fixture 38.

The transmission locations 52 and the reception locations 54 may be coupled to single-mode fiber optic cables (pitch cables) and multi-mode fiber optic cables (catch cables), respectively. Utilization of single-mode fiber optic cables for the pitch and multi-mode fiber optic cables for the catch may assist in maintaining alignment between the transmission and reception optics. These cables may allow for the transmission of light to the transmission locations 52 and may facilitate the transmission of light from the reception locations 54. The pitch and catch cables may be fed into the interior of the imaging fixture 38 via a conduit or passage, i.e. a wireway, in the imaging fixture. This conduit may be machined into the periphery of the fixture to accommodate the cables. As set forth above, the cables allow for light to be transmitted to the transmission locations 52 such that the transmission locations 52 transmit optical beams 56 to the reception locations 54. The optical beams 56 may then be transmitted to the switch 40, via a second set of fiber optic cables, as described above, for analysis.

Figure 5:
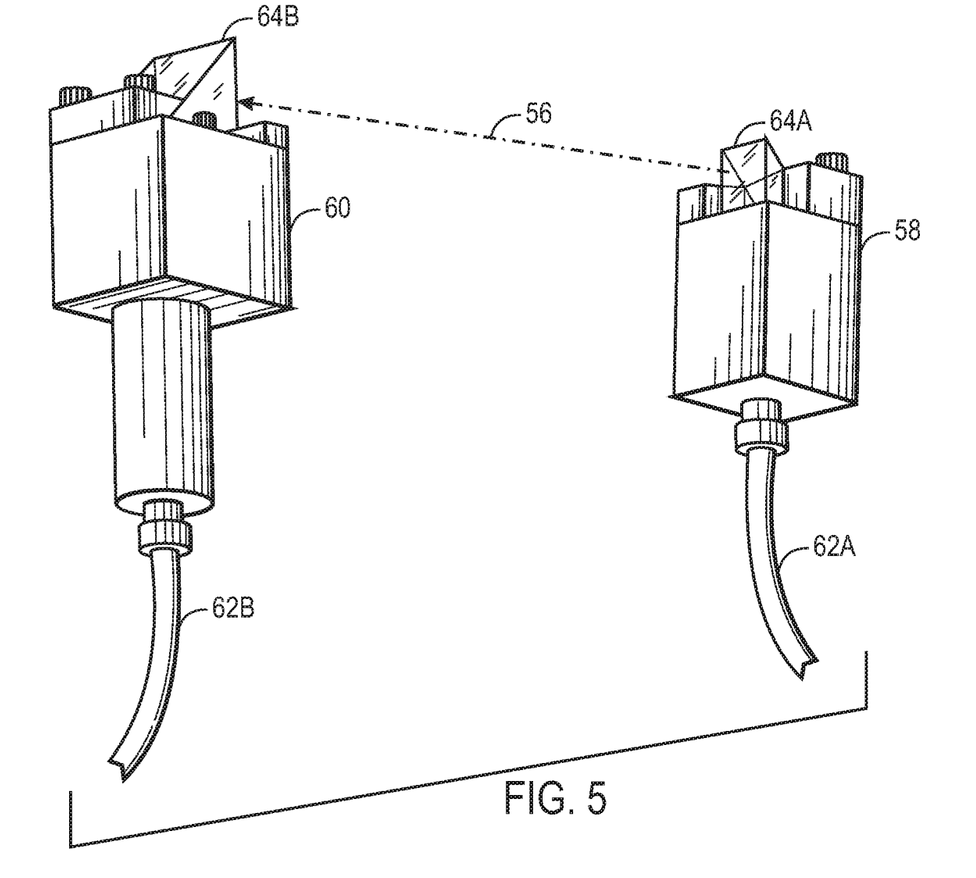
FIG. 5 is a diagram of collimators for use with the system of FIG. 1.

FIG. 5 illustrates a transmission collimator 58 that may be located at each of the transmission locations 52, as well as a reception collimator 60 that may be located at each of the reception locations 54. Each collimator 58 and 60 may be constructed of materials that can withstand the environment of the exhaust 16 of the turbine engine 10, such as temperatures of, for example, approximately 900° F. (755° K). In one embodiment, the collimators 58 and 60 may be composed of stainless steel.

As described previously, light is transmitted as an optical beam 56 from the transmission locations 52 to the reception location 54. The transmission collimator 58 and the reception collimator 60 aid in this transmission of the optical beam 56. For example, light may enter the transmission collimator 58 via a fiber optic cable 62A. The transmission collimator 58 may accept light, which may be divergent, from the fiber optic cable 62A and may collimate the light, i.e., channel the light into a single direction. The transmission collimator 58 may also include an anti-reflection coated fused silica prism 64A. The prism 64A may be between approximately 5 and 15 mm in height and between 5 and 15 mm in width and may re-direct the collimated light through, for example, internal reflection. In one embodiment, the prism 64A may redirect the collimated light 90-degrees.

A second anti-reflection coated fused silica prism 64B may be coupled to the reception collimator 60. This prism 64B may be structurally similar to the prism 64A, for example, the prism 64B may redirect the collimated light 90-degrees. However, prism 64B may be sized differently than the prism 64A. For example, the prism 64B may be approximately twice the dimensions of the prism 64A. In another embodiment, the prism 64B may be between approximately 10 and 30 mm in height and between 10 and 30 mm in width.

Utilization of the prism 64B may offer a significant advantage in the beam 56 acceptance angle of the reception collimator 60, as compared to a generic collimator alone. For example, the collimators 58 and 60 may enjoy a tolerance window that is approximately twice as large as a conventional collimator because the laser light propagates through a fused silica material before entering the collimator 58, which, because of its index of refraction (n=1.44) being greater than that of air, (n=1.0), the enlarges solid angle of reception offered by the reception collimator 60 according to Snell's Law.

Accordingly, transmission and reception collimators 58 and 60 may be utilized with the image fixture 38 to improve optical beam 56 transmission and reception. The optical beams 56 may be utilized in conjunction with an imaging grid in the exhaust 16 of the turbine engine 10. This grid may provide locations for the optical beams 56 that may correspond to locations in the exhaust 16 of the gas turbine engine 10. Accordingly, the grid may be used to determine the temperature distribution of exhaust gasses passing through the grid via determination of the absorption level of light in the optical beams in each portion of the grid.

The determination of the absorption levels of the optical beams 56 may be performed, for example, in the processor(s) of the converter 44 by use of tunable diode laser absorption spectroscopy (TDLAS) techniques. TDLAS relies on the absorption by certain gas molecules of energy at specific wavelengths in the electromagnetic spectrum. For example, molecular species such as $H_2O$, $O_2$, and $CO_2$ absorb light at discrete electromagnetic frequencies, i.e., absorption transitions. At wavelengths slightly below or above the absorption transitions, there is essentially no absorption of the transmitted light. Therefore, by transmitting a beam of light through a gas mixture containing a quantity of the target molecules, adjusting the wavelength of the beam of light to scan from just below to just above an absorption transition of the target molecules, and measuring the absorption of the beam of light, the temperature of the target molecules in the gas may be determined. That is, the amount of light absorbed by the molecule at a given frequency may be related to the temperature of the gas and the concentration of the absorbing species through the Beer-Lambert law, commonly written as $$\frac{I}{I_o} = e^{(-k_v L)},$$

where $I_o$ is the transmitted light intensity from the laser, I is the incident intensity on the detector, $k_o$ is the spectral absorption coefficient, and L is the path length of the light.

Moreover, by taking the natural logarithm of equation one, the absorbance A may be found. This may be represented as $$A = \ln\left(\frac{I_o}{I}\right) = S(v, T)\phi(v, T, P, \chi_j) P \chi_j.$$

Furthermore, if two laser frequencies, $v_1$ and $v_2$, are used to access two discrete molecular transitions, the ratio of integrated absorbance becomes a sole function of temperature, as the mole fraction $\chi_j$, i.e., the species concentration, pressure P, and path length L cancel, and line shape $\phi$ integrates to 1, leaving $$\frac{A(v_2)}{A(v_1)} = R(T).$$

For example, if the molecular transitions for water in the exhaust gas of the gas turbine 10 over the 6862 and 6673 $cm^{-1}$ frequencies are scanned, the resultant distribution of the absorption of the optical beams 56 may provide the necessary data for the calculation of the temperature of the exhaust gas at the points through which the optical beams 56 passed. That is, measured transitions of, for example, the transitions of water in the exhaust 16 of the turbine engine 10 may be monitored for use in detecting the temperatures of the exhaust gas at a given location in the exhaust 16. Furthermore, the temperatures of the exhaust gas may be represented, for example, on a monitor in the workstation 46. Image reconstruction techniques, for example, may be utilized in representing the temperatures of the exhaust gas in the exhaust 16 on the workstation 46, and may be based on the measured absorption of light of the optical beams 56 in the grid discussed above.

Figure 6:
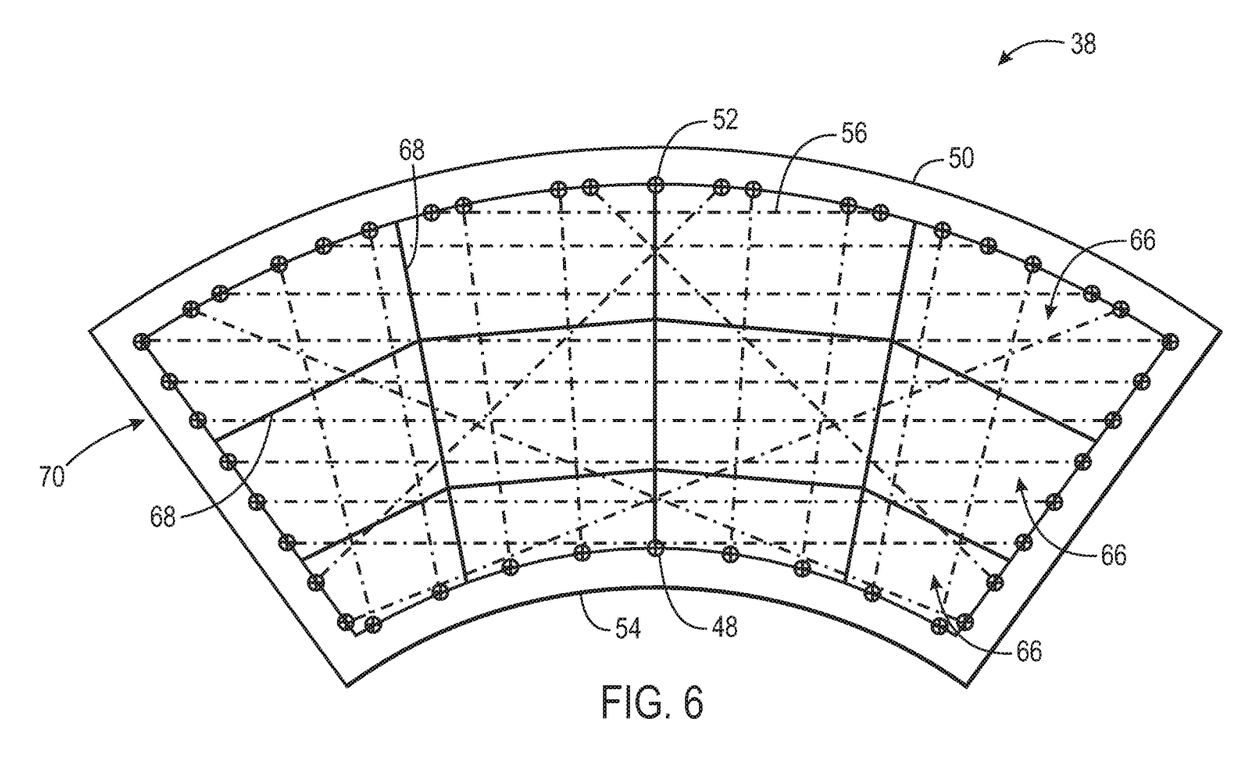
FIG. 6 is a diagram of measurement tiles across the image fixture of FIGS. 3A-3D.

As may be seen in FIG. 6, an imaging fixture 38 is illustrated with optic transmission locations 52, optic reception locations 54, optical beams 56 includes tiles 66, i.e. regions, in the imaging fixture, represented by tile lines 68 that form a grid 70 that may operate to measure temperatures in the exhaust 16 of the gas turbine engine 10. The fidelity of the reconstructed temperature distribution may be dependent on the location and relative spacing of the beams 56 in each tile 66. That is, tiles 66 where the beam 56 density is high will have better temperature resolution, while open areas where few beams 56 exist will embody elevated precision uncertainties. These tiles 66 may be sectors upon which the absorption from each beam 56 may be determined by, for example, the processor(s) of the converter 44. The results of these determinations may be mapped to a display in the workstation 46 via, for example, an imaging system. The imaging system may be, for example, located in the workstation 46. Alternatively, the imaging system may include the processor(s) of the converter 44. Regardless of the location of the imaging system, image reconstruction techniques, such as use of one or more image reconstruction algorithms, may be utilized by the imaging system to generate a representative image of the temperature distribution in the exhaust 16. One such algorithm used in the determination of the absorption levels, the temperature of the exhaust derived therefrom, and the subsequent mapping of the results will be described below.

The choice of the image reconstruction algorithm and laser mesh geometry, i.e., the size of the tiles 66, may have a direct impact on the fidelity of the final temperature image generated, for example, by the imaging system. As illustrated, FIG. 6 includes a plurality of sectors, i.e. tiles 66, to be imaged within the turbine exhaust 16. The dashed lines represent the optical beams 56, while the solid lines, which form the polygonal areas, represent the tiles 66 upon which the absorption from each beam are to be mapped. Accordingly, for example, there may be n optical beams 56 are and m tiles 66, whereby, in one embodiment, n is greater than m. The relationship between the optical beams 56 and the tiles 66 may be expressed as follows: $[P]_n = \|B\|_{n,m} [R]_m [P]$, whereby [P] is an vector that represents the absorbance A (as set forth above) of all n beams and [R] is a vector of absorbance values for the m tiles 70. $\|B\|_{n,m}$ is an array of n by m weight values or basis functions that may be used to map the absorbance of each beam 56 to a particular tile 66. For example, different weight functions such as uniform, Gaussian, or cubic spline weight functions may be employed to tailor the influence of the beams 56 at various locations within a tile 66 to the mapped absorbance.

To calculate the absorbance within the given tile 66, a least-squares approach may be employed, whereby $[R]_n = (\|B\|^T \|B\|)^{-1} [P]_m$. This absorbance may then be utilized by the imaging system to generate images representative of the temperature for each tile 66 of the grid 70 based on the absorbance determined, for example, by the least-squares method above. Accordingly, the number of beams 56 in a tile 66 may thus influence the temperature images generated by the imaging system for display on the workstation 46 as an overall temperature image. That is, the location of the true temperature maxima and/or minima in the exhaust plane may be based upon the position of each beam 56. Accordingly the beams 56 may be initially positioned using an a priori understanding of the conditions of the turbine engine 10 so that the positioning of the beams 56 may be optimized for temperature measurements.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An engine efficiency monitoring system, comprising:
a hollow fixture comprising a frame mountable and operable in a path of hot gasses of the engine;
optical transmitters positioned on the fixture for transmitting laser light as absorption light;
optical receivers positioned on the fixture for receiving the absorption light; and
a processor adapted to analyze a condition of the engine based upon the received absorption light.

2. The system of claim 1, further comprising a tunable diode laser for providing laser light.

3. The system of claim 1, further comprising first and second lasers adapted to transmit the laser light at frequency first and second specified frequencies.

4. The system of claim 1, further comprising a switch adapted to receive the laser light and serially apply the light to the optical transmitters.

5. The system of claim 1, wherein a first side of the fixture comprises a plurality of transmission locations, and wherein the optical transmitters are positioned in the transmission locations.

6. The system of claim 5, further comprising a plurality of transmitter collimators, each transmission collimator terminating a respective optical transmitter at an interior edge of the fixture.

7. The system of claim 6, wherein each transmission collimator comprises a silica prism.

8. The system of claim 5, wherein at least one other side comprises a plurality of reception locations, and wherein the optical receivers are positioned in the reception locations.

9. The system of claim 5, further comprising a plurality of receiver collimators, each receiver collimator terminating a respective optical receiver at an interior edge of the fixture.

10. The system of claim 6, wherein each receiver collimator comprises a silica prism.

11. The system of claim 1, wherein the optical transmitters and optical receivers are situated on opposite inner sides of the imaging fixture.

12. The system of claim 1, wherein the fixture comprises a first side comprising an outer radius, a second side comprises an inner radius, and third and fourth sides coupling the inner and outer radii.

13. The system of claim 12, wherein the hollow fixture comprises a first hollow fixture, and further comprising additional hollow fixtures, wherein the first and additional hollow fixtures are mountable along an annulus of an exhaust outlet of the engine.

14. The system of claim 1 wherein the optical transmitters comprise single mode fiber optic cables, and wherein the optical receivers comprise multi-mode fiber optic cables.

15. The system of claim 2 wherein the analyzed condition comprises an exhaust temperature of the engine.

16. The system of claim 15 wherein the tunable diode laser is tunable to transmit light at different wavelengths, and wherein the processor is adapted to measure at least one of water vapor, oxygen, and carbon dioxide and use the measurement for analyzing the temperature condition.

* * * * *

UNITED STATES PATENT AND TRADEMARK OFFICE
CERTIFICATE OF CORRECTION

| | |
|---|---|
| PATENT NO. | : 8,416,415 B2 |
| APPLICATION NO. | : 12/430337 |
| DATED | : April 9, 2013 |
| INVENTOR(S) | : Woodmansee et al. |

It is certified that error appears in the above-identified patent and that said Letters Patent is hereby corrected as shown below:

On the Title Page, in item (57), under "ABSTRACT", in Column 2, Line 8, delete "thru" and insert -- through --, therefor.

On Title Page 2, in item (56), under "OTHER PUBLICATIONS", in Column 2, Line 13, delete "Applieed Opticts;" and insert -- Applied Optics; --, therefor.

In the Specifications:

In Column 4, Line 29, delete "42" and insert -- 40 --, therefor.

In the Claims:

In Column 9, Line 19, in Claim 2, delete "providing laser" and insert -- providing the laser --, therefor.

In Column 9, Line 21, in Claim 3, after "light at", delete "frequency".

Signed and Sealed this
Fourth Day of June, 2013

Teresa Stanek Rea
*Acting Director of the United States Patent and Trademark Office*